United States Patent Office 3,851,005
Patented Nov. 26, 1974

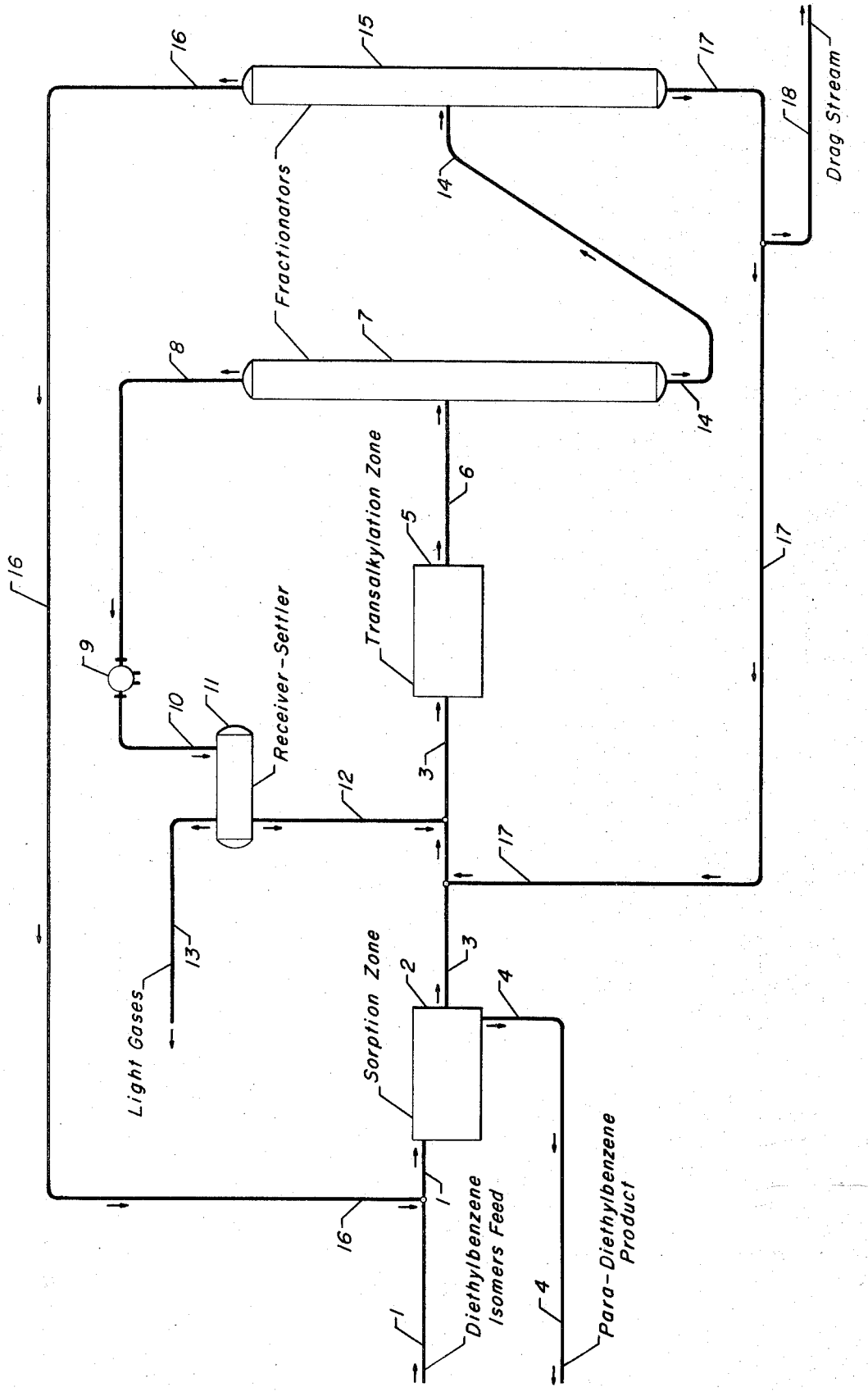

3,851,005
PROCESS FOR PRODUCING PARA-DIETHYLBENZENE
Dennis J. Ward, South Barrington, Ill., assignor to Universal Oil Products Company, Des Plaines, Ill.
Filed Aug. 10, 1973, Ser. No. 387,396
Int. Cl. C07c 3/62
U.S. Cl. 260—672 T
9 Claims

ABSTRACT OF THE DISCLOSURE

A process for producing pure para-diethylbenezene from a hydrocarbon feedstock containing a mixture of diethylbenzene isomers. Para-diethylbenzene is first separated from the feedstock and recovered using a crystalline aluminosilicate zeolitic adsorption-desorption operation; the resulting mixture of meta- and ortho-diethylbenzene is recovered from the adsorption-desorption step and contacted with a transalkylation catalyst to produce a mixture of benzene and alkylaromatics, including para-diethylbenzene having from one to six ethyl group substituents; the mixture recovered from the transalkylation step is fractionated to form a low-boiling stream containing benzene and ethylbenzene, an intermediate-boiling stream containing the three diethylbenzene isomers and a high-boiling stream containing alkylaromatics having three or more ethyl group substituents; the low-boiling stream and high-boiling stream are recycled to the transalkylation step and the intermediate-boiling stream is passed to the zeolitic separation step in admixture with the diethylbenzenes feedstock.

BACKGROUND OF THE INVENTION

This invention relates to a process for producing para-diethylbenzene. More specifically, this invention relates to a process for producing para-diethylbenzene using a combination of zeolitic diethylbenzene isomers separation, transalkylation of alkylaromatics and fractionation.

Para-diethylbenzene is known as a valuable chemical substance having a variety of uses. Para-diethylbenzene or its dehydrogenated product can be employed as a chemical building block in the production of, for example, plastics. Paradiethylbenzene also has utility as a particularly efficient desorbent material for use in processes which employ crystalline aluminosilicate zeolites to separate xylene isomers. The use of para-diethylbenzene in xylene separation schemes is described fully in U.S. Pat. 3,686,342. Para-diethylbenzene is more valuable than are the other diethylbenzene isomers, meta-diethylbenzene, and ortho-diethylbenzene. Commercially, however, para-diethylbenzene is generally available only in admixture with the less valuable meta- and ortho-diethylbenzene isomers. The three diethylbenzene isomers have normal boiling points which are within about five degrees of each other. This makes separation of para-diethylbenzene from the other diethylbenzene isomers by fractionation economically infeasible. Separation of the diethylbenzene isomers by crystallization techniques is also known in the art to be difficult and expensive.

As used herein, the term "polyethylbenzenes" refers to monocyclic alkylaromatics having three or more ethyl group substitutions of the benzene ring, i.e., the triethylbenzenes, tetraethylbenzenes, pentaethylbenzene, hexaethylbenzene, and does not include para-diethylbenzene, meta-diethylbenzene, or ortho-diethylbenzene. As generally employed in the art and as used herein, the term "transalkylation" refers collectively to a combination of reactions which occur when an alkylaromatic hydrocarbon, which may or may not be admixed with other alkylaromatics or benzene, is contacted with certain catalysts at particular reaction conditions. For example, "transalkylation" includes disproportionation reactions undergone by alkylaromatic hydrocarbons such as, for example, the conversion of ethylbenzene into diethylbenzene and benzene. "Transalkylation" also includes such reactions as, for example, conversion of a mixture of benzene and tetraethylbenzene into diethylbenzenes. In general when a particular alkylaromatic is contacted with a transalkylation catalyst at transalkylation conditions, the particular alkylaromatic thus contacted is converted into an essentially equilibrium mixture of benzene and all of the alkylaromatics having one to six alkyl substitutions, the exact number of alkylaromatic species produced depending upon the number of different alkyl group substituents in the particular alkylaromatic to be converted. Thus, for example, when a mixture of meta-diethylbenzene and ortho-diethylbenzene is contacted with a transalkylation catalyst at transalkylation conditions, the resulting products will include benzene, ethylbenzene, all three of the diethylbenzene isomers, and at least a small amount of all the polyethylbenzenes, especially the triethylbenzenes.

SUMMARY OF THE INVENTION

An object of this invention is to provide a method for obtaining substantially pure para-diethylbenzene from a mixture of diethylbenzene isomers.

Another object of this invention is to provide para-diethylbenzene by a combination of molecular sieve separation, transalkylation of alkylaromatics, and fractionation of a mixture comprising benzene and alkylaromatics containing from about one to about six ethylenic alkyl substitutions.

Another object of this invention is to provide an economical method for producing pure para-diethylbenzene from readily available hydrocarbon feedstocks.

In an embodiment, the present invention relates to a process for producing a para-diethylbenzene product from a feedstock comprising a mixture of para-diethylbenzene, meta-diethylbenzene, and ortho - diethylbenzene, which comprises the steps of: contacting the feedstock with a zeolitic crystalline aluminosilicate sorbent in a sorption zone at sorption conditions to separate para-diethylbenzene and form a para-diethylbenzene-lean stream comprising meta-diethylbenzene and ortho-diethylbenzene, and recovering from the transalkylation zone a transalkylazene as the product; removing the para-diethylbenzene-lean stream from the sorption zone, contacting the para-diethylbenzene-lean stream with a transalkylation catalyst in a transalkylation zone at transalkylation conditions and recovering from the transalkylation zone transalkylation zone effluent comprising benzene, ethylbenzene. para-diethylbenzene, meta-diethylbenzene, ortho - diethylbenzene, and polyethylbenzenes, separating the transalkylation zone effluent to provide a low-boiling stream comprising benzene and ethylbenzene, an intermediate-boiling stream comprising para-diethylbenzene, meta-diethylbenzene and ortho-diethylbenzene, and a high-boiling stream comprising polyethylbenzene; contacting the low-boiling stream and the high-boiling stream with the transalkylation catalyst in the transalkylation zone in admixture with the para-diethylbenzene-lean stream; and contacting the intermediate-boiling stream with the sorbent in the sorption zone in admixture with the diethylbenzenes feedstock.

DESCRIPTION OF THE DRAWING

The attached drawing is a schematic representation of one of the embodiments of the process of this invention. The drawing illustrates one embodiment of the process, and the scope of the process is not limited thereto. Other embodiments and variations within the scope of the present invention will be apparent to those skilled in the art from the description of the drawing and the following detailed description of the invention.

Referring to the drawing, fresh diethylbenzene isomers feedstock is charged to the process through conduit 1 at the rate of 3.17 moles per hour of meta-diethylbenzene, 1.28 moles per hour of para-diethylbenzene, 0.23 mole per hour of orthodiethylbenzene and 0.23 mole per hour of butylbenzene. Recycled hydrocarbons from conduit 16, derived as described below, are passed into conduit 1 at the rate of 9.86 moles per hour of meta-diethylbenzene, 3.82 moles per hour of para-diethylbenzene, 1.42 moles per hour of ortho-diethylbenzene and 0.23 mole per hour of butylbenzene. The combined hydrocarbon stream formed from the charged fresh feedstock and the recycled hydrocarbons is charged further through conduit 1 into sorption zone 2. In sorption zone 2, the hydrocarbon charge is contacted with a type Y zeolite sorbent containing a combination of barium and potassium cations. Para-diethylbenzene is selectively absorbed by the sorbent, and meta-diethylbenzene, ortho-diethylbenzene and any other hydrocarbons present in the charge, in this case butylbenzene, are rejected by the sorbent. The rejected, para-diethylbenzene-lean mixture of meta-diethylbenzene, ortho-diethylbenzene and butylbenzene or raffinate, is withdrawn from sorption zone 2 by way of conduit 3 at the rate of 12.93 moles per hour of meta-diethylbenzene, 1.65 moles per hour of ortho-diethylbenzene, 0.5 mole per hour of para-diethylbenzene and 0.46 mole per hour of butylbenzene. Para-diethylbenzene is subsequently desorbed from the zeolite in sorption zone 2, removed from zone 2 and withdrawn from the process as the product at the rate of 4.6 moles per hour of para-diethylbenzene and 0.1 mole per hour of meta-diethylbenzene. A relatively low-boiling hydrocarbon fraction in conduit 12, derived as described below, is passed into admixture with the para-diethylbenzene-lean raffinate in conduit 3 at the rate of 3.69 moles per hour of ethylbenzene and 0.67 mole per hour of benzene. A relatively high-boiling hydrocarbon fraction in conduit 17, derived as hereinafter described, is also passed into conduit 3 at the rate of 9.39 moles per hour of polyethylbenzenes, primarily triethylbenzenes. The hydrocarbon mixture thus formed in conduit 3 is passed further through conduit 3 into transalkylation zone 5 at the rate of 12.93 moles per hour of metadiethylbenzene, 9.39 moles per hour of polyethylbenzenes, 3.69 moles per hour of ethylbenzene, 1.65 moles per hour of ortho-diethylbenzene, 0.67 mole per hour of benzene, 0.50 mole per hour of para-diethylbenzene and 0.46 mole per hour of butylbenzene. In transalkylation zone 5, the hydrocarbon charge is contacted with a boron trifluoride-modified substantially anhydrous alumina transalkylation catalyst. Transalkylation conditions maintained in zone 5 include a temperature of about 400° F., a pressure of 20 atmospheres and a liquid hourly space velocity of about 2. Reacted hydrocarbons, including para-diethylbenzene produced in the transalkylation reaction, are withdrawn from transalkylation zone 5 through conduit 6 at the rate of 9.86 moles per hour of meta-diethylbenzene, 9.39 moles per hour of polyethylbenzenes, 3.82 moles per hour of para-diethylbenzene, 3.69 moles per hour of ethylbenzene, 1.42 moles per hour of ortho-diethylbenzene, 0.9 mole per hour of benzene and 0.23 mole per hour of butylbenzene. The reactor effluent in conduit 6 is passed into fractionator 7. In fractionator 7, the reactor effluent is fractionated to form an overhead low-boiling stream comprising benzene and ethylbenzene, which is withdrawn from fractionator 7 through conduit 8 along with any light gases which may be formed in the transalkylation operation or which may be passed into the operation along with the diethylbenzene isomers feedstock. The low-boiling hydrocarbon overhead from fractionator 7 is withdrawn through conduit 8 at the rate of 3.69 moles per hour of ethylbenzene and 0.67 mole per hour of benzene. The low-boiling hydrocarbon overhead in conduit 8 is passed into condenser 9 where it is liquefied and then charged through conduit 10 into receiver-settler 11. Light materials which remain gaseous after the condensation operation in condenser 9 are withdrawn from the top of receiver-settler 11 through conduit 13 at a rate required in order to maintain the overall operation in balance. The ethylbenzene and benzene hydrocarbons in receiver-settler 11 are withdrawn through conduit 12 and passed into conduit 3 as described above. Referring again to fractionator 7, a bottoms product is withdrawn from fractionator 7 through conduit 14 and passed into fractionator 15. The bottoms product withdrawn into conduit 14 from fractionator 7 contains the diethylbenzene isomers and the polyethylbenzenes and butylbenzene charged to fractionator 7 through conduit 6. Referring to fractionator 15, an intermediate-boiling cut of the transalkylation operation effluent is withdrawn overhead from fractionator 15 through conduit 16 and recycled to sorption zone 2 through conduit 16 and conduit 1 as described above. The intermediate-boiling fraction withdrawn overhead from fractionator 15 through conduit 16 contains primarily diethylbenzene isomers along with some butylbenzene. A high-boiling fraction of the transalkylation operation effluent is also removed from fractionator 15 as liquid bottoms by way of conduit 17. The high-boiling fraction removed from fractionator 15 through conduit 17 comprises polyethylbenzenes, primarily triethylbenzenes. It is passed back into conduit 3 and therethrough into transalkylation zone 5 as described above. Small amounts of the high-boiling bottoms which is withdrawn from fractionator 15 through conduit 17 may be removed from the process as a drag stream through conduit 18 at the rate required in order to maintain the process in balance, if such is found necessary.

DETAILED DESCRIPTION OF THE INVENTION

The hydrocarbon feedstocks which may suitably be employed in the process of this invention include aromatic hydrocarbon fractions containing substantial amounts of the three diethylbenzene isomers. Suitable hydrocarbon fractions are most readily commercially available as byproduct streams recovered from operations for producing styrene from benzene and ethylene. Generally, in such styrene production operations, benzene is alkylated with ethylene in order to produce the desired primary alkylation reaction product, ethylbenzene, resulting as well in production of by-products such as diethylbenzenes and polyethylbenzenes. Ethylbenzenes thus produced is then separated from the by-products which are formed in the alkylation process. The ethylbenzene is separated by the use of fractionation, and the ethylbenzene is then passed to a dehydrogenation operation in order to produce styrene. The by-product streams which are separated from the ethylzenzene may contain substantial amounts of the diethylbenzene isomers and polyethylbenzenes, as well as minor amounts of such other alkylaromatics as methylethylbenzene, isopropylbenzene, etc., and particularly butylbenzene. The make up of any particular feedstock to be used in the present process, when such feedstock is derived from a styrene production operation, will depend upon the exact fractionation capabilities which are available in the styrene production operation to provide a relatively pure supply of diethylbenzene isomers. Thus, feedstocks which contain substantial amounts of alkylaromatics other than diethylbenzenes may be employed in the present process. This is particularly true of feedstocks which contain benzene, ethylbenzene and polyethylbenzenes. It is generally preferred that the feedstocks used in the process of this invention contain at least 75 mole percent of diethylbenzenes, with the remainder being preferably made up of benzene, ethylbenzene, and polyethylbenzenes.

The product of the present process is substantially pure para-diethylbenzene. Heretofore, it has not been commercially practical to provide any one of the diethylbenzene isomers in substantially pure form. The normal boiling points of para-diethylbenzene, meta-diethylbenzene and ortho-diethylbenzene are, respectively, about 362.8° F., 358.0° F., and 362.2° F. The relatively small differences in the boiling points of the diethylbenzene isomers have heretofore made separation in any one of them by conventional fractionation practically impossible. Separation of the diethylbenzene isomers by crystallization techniques has also been found to be tedious and expensive and has prohibited the practical production of a pure diethylbenzene isomer. The process of the present invention, utilizing molecular sieve separation, transalkylation and fractionation, provides a method, not only for recovering pure para-diethylbenzene, but also for converting the other diethylbenzene isomers and other ethylenically substituted alkylaromatics into a pure paradiethylbenzene product. Generally, the present process can provide para-diethylbenzene in substantial quantities as pure as 99 mole percent para-diethylbenzene, and the present process is often capable of producing para-diethylbenzene at purities as high as 99.5 mole percent.

The first essential step in the process of the invention is the processing of the fresh feedstock and a recycled intermediate-boiling stream containing diethylbenzene isomers in a sorption zone in order to separate and recover para-diethylbenzene from the mixture of fresh feedstock and intermediate-boiling recycled hydrocarbon fraction. The recycled fraction utilized in the sorption step is recovered from transalkylation and fractionation steps described below. The mixture of fresh feedstock and recycled intermediate-boiling, or heart-cut, fraction is passed to the sorption zone in order to form a stream of substantially pure para-diethylbenzene which is recovered from the process and also to form a portion of the charge to the transalkylation step from the other hydrocarbons charged to the sorption operation with the para-diethylbenzene. In the sorption zone, the fresh feed-recycle mixture is contacted with a zeolite crystalline aluminosilicate sorbent which selectively either (1) adsorbs para-diethylbenzene and rejects meta-diethylbenzene, ortho-diethylbenzene and other hydrocarbons, or (2) adsorbs meta-diethylbenzene and ortho-diethylbenzene and rejects para-diethylbenzene and other hydrocarbons. The rejected component, herein termed "raffinate," is then withdrawn from contact with the crystalline aluminosilicate sorbent and removed from the sorption zone. The component which is adsorbed in the crystalline aluminosilicate is subsequently desorbed, separated from any desorbent substance, if one is used, and removed from the sorption zone. The scope of the zeolitic para-diethylbenzene separation step in the present process includes both embodiments wherein para-diethylbenzene is preferentially adsorbed onto the crystalline aluminosilicate and also embodiments wherein the meta-diethylbenzene and ortho-diethylbenzene isomers are preferentially adsorbed onto the crystalline aluminosilicate.

Any zeolitic crystalline aluminosilicate sorbent which (1) selectively adsorbs para-diethylbenzene relative to meta-diethylbenzene and ortho-diethylbenzene, or (2) selectively adsorbs meta-diethylbenzene and ortho-diethylbenzene relative to para-diethylbenzene may be employed as the sorbent in the present process. Crystalline aluminosilicate sorbents suitable for use include, for example, type X and type Y structured zeolites which contain selected cations at exchangeable cationic sites within the crystalline structure of the sorbents. A more detailed description of representative zeolites which may be utilized with suitable modification as the sorbent in this process may be found in U.S. Pat. 2,882,244 and U.S. Pat. 3,130,007. Such crystalline aluminosilicate sorbent may be composited with binder materials such as clay in order to provide particles of a size which are convenient for use in the sorption operation. Both natural and synthetic crystalline aluminosilicates may be used in the separation operation. As originally prepared or naturally occurring, such zeolites are made up of a crystalline cage-like structure which is built up $AlO_4$ and $SiO_4$ tetrahedra, with the interior of the cages occupied by water molecules. Electrochemical neutrality in the zeolite is preserved by the association of a cation, normally sodium, with each $AlO_4$ tetrahedron in the zeolite structure. When the zeolite is dehydrated, for example, by calcination, the crystalline cage-like network in the zeolite is preserved, resulting in a structure of pores and channels of approximately molecular dimensions. Prior to such dehydration, the cation content of these crystalline aluminosilicates may be modified by the substitution of one or more cations for the original cation, which is usually sodium. For example, such cations as potassium, barium, etc., may be exchanged into the zeolite and exchangeable sites. Methods for exchanging various cations into the structure of these zeolites are well known in the art. The preferred zeolites for use in the process as the sorbent include, as stated above, the type X and type Y structured zeolite sorbents. The sorbents which are useful in the separation operation of the present process contain, at their ion exchangeable sites, one or more cations from the group of potassium, rubidium, cesium, barium, copper, silver, lithium, sodium, beryllium, magnesium, calcium, strontium, cadmium, cobalt, nickel, manganese and zinc, or combinations thereof. Zeolites containing a single species of ions which are selective in adsorbing para-diethylbenzene include zeolites containing one cation from the group of potassium, rubidium, cesium, silver, or barium. Zeolites containing a single species of cations which are selective in adsorbing meta- and ortho-diethylbenzene include zeolites which contain one cation from the group of lithium, sodium, beryllium, magnesium, calcium, strontium, manganese, cadmium and copper. Particularly preferred as the zeolite sorbent in the present process is a type Y structured or type X structured crystalline aluminosilicate containing a combination of potassium cations and barium cations, which zeolite is particularly selective in adsorbing para-diethylbenzene relative to meta- and ortho-diethylbenzenes.

The overall zeolitic separation operation may be performed in either a batch-type system or a continuous fixed-bed or moving bed system. In a batch-type system, a fixed amount of the mixture of fresh feed and recycled, intermediate-boiling diethylbenzene isomers cut is passed into a chamber which contains a fixed quantity of the crystalline aluminosilicate sorbent and the hydrocarbon charge is allowed to contact the sorbent for a predetermined time. Hydrocarbons which have not been adsorbed into the sorbent, i.e., the raffinate materials, are then purged out of the chamber. The purging may be accomplished by gravity separation, pressurization, or other well known techniques. A desorbent material may then be passed into the chamber in order to remove the adsorbed hydrocarbons from the crystalline aluminosilicate sorbent. Alternatively, adsorbed hydrocarbons may be removed from the crystalline aluminosilicate sorbent by subjecting the sorbent to heat and/or low pressures. Examples of suitable desorbent substances which may be used to desorb the preferentially adsorbed diethylbenzene isomer or isomers in the present process include benzene, toluene, ethylbenzene, etc. In order to be suitable for use in the present process as a desorbent, a substance must be easily separated from diethylbenzenes by simple fractionation. The desorbent must have a boiling point or boiling range sufficiently different from the diethylbenzenes to facilitate fractionation. Desorbents may suitably be used as mixtures of higher boiling point materials or mixtures of lower boiling point materials, relative to the diethylbenzenes, or desorbents may suitably contain two or more components having both higher boiling points and lower boiling points than the diethylbenzene isomers. In a continuous fixed-bed or moving-bed system, which are preferred for use in the present process, adsorption and desorption take place continuously. This mode of operation allows continuous flow of the mixture of fresh feedstock and recycled intermediate-boiling isomers stream into the sorption zone and allows a continuous production of paradiethylbenzene. Examples of continuous systems suitable for use in the present process with obvious minor modifications may be found in U.S. Pat. 3,374,099 and U.S. Pat. 3,310,486.

Sorption conditions in the present process may include either vapor phase or liquid phase operations. Liquid phase operations in the sorption zone are preferred because of the lower heat requirements and the improved sorbent selectivity which are associated with lower temperatures. Sorption conditions generally include a temperature of about 50° F. to about 500° F. and a pressure in the range from about one atmosphere to about 35 atmospheres or more. It is preferred to employ pressures in the sorpotion zone which are below about 35 atmospheres because of the obvious economic advantages associated with low pressure operations. Desorption of the selectively adsorbed component may be effected by, in addition to, or as a substitute for, the desorbents described above, reduced pressures or elevated temperatures or a combination thereof. For example, vacuum purging of a zeolitic sorbent to remove the adsorbed component from the sorbent may be utilized. Alternatively, the sorbent may be heated to drive the adsorbed component off from the sorbent as a vapor. In general, the mixture of fresh diethylbenzene isomers feedstock and the recycled heart-cut of diethylbenzene isomers, recovered from the fractionation operation described hereinafter, is contacted with a suitable crystalline aluminosilicate sorbent, and, depending upon the particular crystalline aluminosilicate which is utilized, either para-diethylbenzene or a para-diethylbenzene-lean mixture of ortho-diethylbenzene and meta-diethylbenzene will be preferentially adsorbed onto the sorbent. Subsequently, the non-adsorbed raffinate material is withdrawn from contact with the sorbent. In embodiments wherein para-diethylbenzene is preferentially adsorbed onto the crystalline aluminosilicate, the non-adsorbed components, or raffinate, will generally include ortho-diethylbenzene and meta-diethylbenzene, as well as any other hydrocarbons present in the feed. The raffinate may also contain a small fraction of para-diethylbenzene because of imperfect separation. After the para-diethylbenzene-lean raffinate has been withdrawn from contact with the sorbent, the adsorbed component, para-diethylbenzene, is subsequently desorbed by utilizing one or more of the above described desorbents, or by other means, separated from the desorbent substance, if necessary, and recovered as the product of the process. Similarly, in an embodiment wherein ortho-diethylbenzene and meta-diethylbenzene are preferentially adsorbed onto the crystalline aluminosilicate sorbent, relative to para-diethylbenzene, the raffinate will comprise para-diethylbenzene. The raffinate is withdrawn from contact with the crystalline aluminosilicate and the para-diethylbenzene thus withdrawn is recovered as the product of the process. In this case, the raffinate may contain other hydrocarbons present in the feed which can be separated from the para-diethylbenzene product by simple fractionation. The adsorbed ortho-diethylbenzene and meta-diethylbenzene are then desorbed, using one or more of the above described desorbents, or by other means, and are separated from the desorbent, if one is used, to form a portion of the charge to the transalkylation zone described hereinafter.

The para-diethylbenzene product is preferably removed from the zeolitic separation unit in substantially pure form, irrespective of the exact sorbent employed, and is then recovered from the process. The para-diethylbenzene-lean mixture of hydrocarbons comprising the meta- and ortho-diethylbenzene isomers as well as butylbenzenes and other hydrocarbons present in the feed to the sorption zone, is passed to the transalkylation operation for further processing as described hereinafter. This para-diethylbenzene-lean sorption zone effluent mixture is processed in the transalkylation step in admixture with a low-boiling stream and a high-boiling stream which are produced by fractionation of the transalkylation zone effluent as described hereinafter. The low-boiling stream and the high-boiling stream, and the para-diethylbenzene-lean mixture of meta- and ortho-diethylbenzene, and possibly other hydrocarbons, recovered from the zeolitic separation step, are generally commingled together and subsequently passed to the transalkylation step. Alternatively, these streams may be separately passed into the transalkylation operation or any combination of two of these three streams may be commingled and subsequently passed into the transalkylation operation.

Suitable transalkylation catalysts for use in the transalkylation step of the present process are those catalysts which are known in the art to be effective for transalkylation of alkylaromatics. For example, Friedel-Crafts metal halides such as aluminum chloride have been employed with good results and are suitable for use in the present process. Hydrogen halides, boron halides, Group I-A metal halides, iron group metal halides, etc., have been found suitable. Refractory inorganic oxides, combined with the above mentioned and other known catalytic materials, have also been found useful in transalkylation operations. For example, various forms of alumina, including gamma-alumina and eta-alumina, as well as silica, magnesia, zirconia, etc., may be employed. Crystalline aluminosilicates have also been employed in the art as transalkylation catalysts. These include, for example, faujasites, mordenites, etc., and these materials may suitably be employed in the present process, if desired, either alone or combined with one or more metals impregnated thereon or ion exchanged therein. Other materials which are suitable as transalkylation catalyst for use in the present process include combinations of inorganic oxides with metal such as those in Group VIII of the Periodic Table and mixtures or compounds of inorganic oxides with rare earth metals. The above mentioned suitable materials are noted as examples, only, and are not meant to constitute a complete list of suitable transalkylation catalysts. Persons skilled in the art will recognize that a large number of suitable catalysts exist, which may be employed as the transalkylation catalyst in the present process within the scope of this invention, but that the results achieved will not necessarily be equivalent to those achieved by the use of the preferred catalyst described below.

A preferred transalkylation catalyst for use in the present process is a boron trihalide-modified refractory inorganic oxide. For example, a boron trifluoride-modified gamma- or eta-alumina is particularly suitable for use. Suitable inorganic oxides, in addition to the above mentioned alumina, include silica, titania, zirconia, chromia, magnesia, zinc oxide, calcium oxide, etc. The particularly preferred boron trifluoride-modified alumina catalyst may be prepared by drying and calcining alumina and subsequently contacting the alumina with from about 2 weight percent to about 100 weight percent of boron trifluoride, based on the alumina, at a temperature below about 600° F. Alternatively, boron trifluoride may be added to a hydrocarbon stream which is to be charged to a transalkylation zone and then charged therewith to the transalkylation zone, in which is placed a fixed bed of dried and calcined alumina. A more detailed description of the preparation and use of boron trihalide-modified refractory inorganic oxides may be found in U.S. Pat. 2,939,890, U.S. Pat. 3,054,835 and U.S. Pat. 3,068,301. Generally, in a transalkylation step utilizing the preferred boron trifluoride-modified alumina as the transalkylation catalyst, boron trifluoride is continuously charged in small amounts to the transalkylation zone in admixture with the hydrocarbons to be reacted and the boron trifluoride is subsequently recovered from the effluent from the transalkylation reactor for further use. This method of operation is preferred for use in the present process.

Transalkylation conditions employed in the present process are those employed in prior art alkylaromatic transalkylation with the particular transalkylation catalyst which is desired to be employed. Transalkylation conditions which are utilized in the present process in conjunction with the preferred boron trifluoride-modified alumina catalyst include a temperature in the range from about 200° F. to about 600° F. preferably from about 300° F. to about 450° F., and a pressure in the range from about 1 atmosphere to about 200 atmospheres or more, preferably about 10 atmospheres to about 40 atmospheres. The pressure employed is at least sufficiently high to maintain the hydrocarbons in the liquid phase during the transalkylation step. A liquid hourly space velocity (LHSV, defined as the volume flow rate per hour of hydrocarbons charged to the transalkylation reactor divided by the volume of the catalyst utilized) between about 0.5 and about 5 is preferably employed. depending upon the particular transalkylation catalyst utilized. The transalkylation step in the present process may be embodied in a batch-type reaction scheme or a continuous-type reaction scheme. A continuous reaction scheme is preferred. This is effected by employing the transalkylation catalyst as a fixed bed in the transalkylation zone and continuously charging the hydrocarbon stream which is to be reacted into the transalkylation zone, passing the hydrocarbons over the catalyst bed, and withdrawing the converted hydrocarbons from the reactor. A large variety of vessels suitable for use as a transalkylation zone, or reactor, are well known in the art. Such vessels may be equipped with heating means, baffles, trays, packing, etc., if desired.

EXAMPLE

As an illustration of the preferred mode of operation of the transalkylation step in the present process, the following procedure was undertaken. A charge stock (similar to the para-diethylbenzene-lean mixture of meta- and ortho-diethylbenzene recovered from the zeolitic separation step of the process of the present invention) was obtained and analyzed. The feedstock was found to contain 80.2 weight percent meta-diethylbenzene, 11.5 weight percent ortho-diethylbenzene and 7.5 weight percent butylbenzene. This charge stock was processed in a conventional transalkylation reactor using a boron trifluoride-modified alumina catalyst. Transalkylation conditions in the operation included a temperature of 400° F., a pressure of about 34 atmospheres and a LHSV of 1.0. The effluent from the transalkylation reactor was collected and analyzed. It was found to have the following composition: light ends (hydrocarbons boiling lower than benzene) 0.7 weight percent, benzene 1.9 weight percent, ethylbenzene 18.8 weight percent, $C_9$ alkylaromatics 0.2 weight percent, butylbenzene 1.3 weight percent, meta-diethylbenzene 31.5 weight percent, para-diethylbenzene 13.3 weight percent, ortho-diethylbenzene 3.2 weight percent, other diethylbenzene boiling range hydrocarbons 0.6 weight percent, triethylbenzenes 23.7 weight percent, other triethylbenzene boiling range hydrocarbons 2.0 weight percent, and heavier hydrocarbons 2.8 weight percent.

It is apparent from the foregoing illustrative example that the effluent from the transalkylation step in the present process generally comprises a mixture of benzene and mono-, di-, and triethylbenzenes, with smaller amounts of higher and heavier hydrocarbons. When the preferred transalkylation catalyst, boron trifluoride-modified alumina, is employed as the transalkylation catalyst in this process, it may be desirable to add a small amount of boron trifluoride to the hydrocarbons which are charged to the transalkylation reactor in order to insure catalyst stability. If such boron trifluoride addition to the charge to the transalkylation reactor in order to insure catalyst for recovery of boron trifluoride from the reactor effluent should be made. Such provisions can be made in a manner well known to the art, for example, by fractionating the transalkylation zone effluent to take overhead light aliphatic gases, boron trifluoride and possibly some benzene. Any benzene thus removed may be recycled directly to the transalkylation reactor along with the primary hydrocarbon charge to the transalkylation reactor which has been previously described. After any necessary purification, such as removal of boron trifluoride, light gases, etc., the hydrocarbon effluent from the transalkylation reactor is passed to the fractionation step, described below.

The fractionation step of the present invention, which is employed to separate the effluent hydrocarbons recovered from the transalkylation step into a low-boiling cut, an intermediate-boiling cut containing diethylbenzens, and a high-boiling cut containing triethylbenzenes and heavier hydrocarbons, may be performed using one or more fractiontion columns. The effluent from the transalkylation zone may contain, in addition to the three diethylbenzene isomers such other hydrocarbons as benzene, ethylbenzene and polyethylbenzenes, small amounts of light aliphatic hydrocarbons such as butanes, and small amounts of heavy ends such as diphenylethane, and similar hydrocarbons of very high boiling point. Thus, when the transalkylation zone effluent hydrocarbons are fractionated in order to produce an intermediate-boiling fraction containing the diethylbenzenes, there are also produced a low-boiling fraction comprising any light aliphatics, benzene, and ethylbenzene and also produce a high-boiling fraction comprising polyethylbenzenes and the heavy ends. As will be apparent to those skilled in the art, one or more separate fractionation vessels and operations may be desirable to separate the intermediate-boiling diethylbenzenes fraction from the low-boiling fraction and the high-boiling fraction. For example, the intermediate-boiling fraction containing the diethylbenzene isomers may be withdrawn as a side cut from a single, relatively large fractionation vessel, with the low-boiling stream containing benzene and ethylbenzene, etc., recovered overhead and the high-boiling stream, containing polyethylbenzenes and other heavy hydrocarbons, recovered from the fractionation vessel as a bottoms product. Alternatively, for example, in a preferred embodiment, two separate fractionation vessels may be employed, with the low-boiling hydrocarbons being recovered overhead from the first fractionation vessel will then comprise the diethylbenzene-first fractionation vessel being further fractionated in a second fractionation vessel. The overhead from the second fractionation vessel will then comprise the diethylbenzene-containing intermediate-boiling fraction, while the bottoms from the second fractionation operation will comprise the high-boiling stream, i.e., the polyethylbenzenes and heavy ends. As used herein, the term "low-boiling stream" refers to the combination of one or more hydrocarbons streams recovered in the fractionation step of the present process which have boiling ranges below the boiling range of the heart-cut which contains the diethylbenzene isomers. Thus, the low-boiling stream may be recovered as a mixture comprising aliphatics, benzene, and ethylbenzene, or these components may each be recovered separately by a separate fractionation operation, depending upon the number of fractionation vessels employed. Generally, it is preferred to recover the low-boiling stream as a single overhead product stream from a single fractionation column. Similarly, the term "high-boiling stream," as used herein, refers to the combination of one or more hydrocarbon streams derived in the fractionation operation which have boiling ranges above the boiling range of the heart-cut which contains the diethylbenzene isomers. Thus, the high-boiling stream may be recovered as a mixture comprising triethylbenzenes, tetraethylbenzenes pentaethylbenzenes, hexaethylbenzene, and heavy ends, or one or more of these various components may be recovered as separate streams, depending upon the particular fractionation scheme employed. Generally, it is preferred to recover the high-boiling stream as a single bottoms product stream from a single fractionation column. The term "intermediate-boiling stream" as used herein, refers to the heart-cut from the fractionation operation, which essentially comprises the diethylbenzene isomers which are present in the transalkylation zone effluent. The intermediate-boiling stream may also contain minor amounts of other hydrocarbons having boiling points similar to those of the diethylbenzene isomers as a result of imprecise fractionation. In addition to the one or more fractionation vessels which may be utilized to provide the low-boiling stream containing ethylbenzene and lighter hydrocarbons, the intermediate-boiling stream containing the diethylbenzene isomers, and the high-boiling stream containing polyethylbenzenes and heavy ends, it may also be desirable to further processs a portion of the high-boiling stream to remove some of the heavy ends such as diphenylethane. Such heavy materials would otherwise build up within the process in excessive amounts. The heavy ends may also be controlled by simply withdrawing a small portion of the high-boiling stream from the process as a drag stream. Likewise, it may also be desirable to treat the low-boiling stream in order to remove any light aliphatic hydrocarbons such as butane which may otherwise build up to excessive amounts within the process.

The intermediate-boiling stream, or heart-cut, which is recovered from the fractionation operation described above, is passed to the sorption zone in admixture with the fresh feedstock, as previously described, for separation in order to recover pure para-diethylbenzene and to provide part of the hydrocarbon charge to the transalkylation operation. The low-boiling stream recovered from the fractionation step and the high-boiling stream reocvered from the fractionation step, as described, are passed directly back into the transalkylation zone for further processing along with the para-diethylbenzene-lean effluent, containing the meta- and ortho-diethylbenzene isomers, which is removed from the sorption zone.

I claim as my invention:

1. A process for producing a para-diethylbenzene product from a feedstock comprising a mixture of para-diethylbenzene, meta-diethylbenzene and ortho-diethylbenzene, which comprises the steps of:
   (a) contacting said feedstock, in admixture with at least a portion of an intermediate-boiling stream formed as hereinafter specified, with a zeolitic crystalline aluminosilicate sorbent in a sorption zone at sorption conditions to separate para-diethylbenzene from said admixed feedstock and intermediate-boiling stream and to form a para-diethylbenzene-lean stream comprising meta-diethylbenzene and ortho-diethylbenzene, and recovering the resulting separated para-diethylbenzene from said sorption zone as said product;
   (b) removing said para-diethylbenzene-lean stream from said sorption zone, contacting at least a portion of said para-diethylbenzene-lean stream, at least a portion of a low-boiling stream formed as hereinafter specified and at least a portion of a high-boiling stream formed as hereinafter specified with a transalkylation catalyst in a transalkylation zone at transalkylation conditions, and recovering from said transalkylation zone a transalkylation zone effluent comprising benzene, ethylbenzene, para-diethylbenzene, meta-diethylbenzene, ortho-diethylbenzene and polyethylbenzenes; and
   (c) separating at least a portion of said transalkylation zone effluent to form said low-boiling stream comprising benzene and ethylbenzene, said intermediate-boiling stream comprising para-diethylbenzene, meta-diethylbenzene and othro-diethylbenzene, and said high-boiling stream comprising polyethylbenzenes.

2. The process of Claim 1 wherein said transalkylation catalyst is a boron halide-modified inorganic oxide.

3. The process of Claim 2 wherein said transalkylation catalyst is a boron trifluoride-modified substantially anhydrous alumina.

4. The process of Claim 1 wherein said transalkylation catalyst is a Friedel-Crafts metal halide.

5. The process of Claim 4 wherein said Friedel-Crafts metal halide is aluminum chloride.

6. The process of Claim 1 wherein said transalkylation catalyst comprises a crystalline aluminosilicate.

7. The process of Claim 1 wherein said crystalline aluminosilicate sorbent is selected from the group consisting of type X structured and type Y structured zeolites.

8. The process of Claim 7 wherein said zeolite contains at least one cation selected from the group consisting of barium and potassium at ion exchangeable sites in said zeolite.

9. The process of Claim 1 wherein at least a portion of said transalkylation zone effluent is fractionated to form a first overhead stream comprising benzene and ethylbenzene and a first bottoms stream comprising para-diethylbenzene, meta-diethylbenzene, ortho-diethylbenzene and polyethylbenzenes, at least a portion of said first overhead stream is utilized as said low-boiling stream, at least a portion of said first bottoms stream is fractionated to form a second overhead stream comprising para-diethylbenzene, meta-diethylbenzene and ortho-diethylbenzene and a second bottoms stream comprising polyethylbenzenes, at least a portion of said second overhead stream is utilized as said intermediate-boiling stream and at least a portion of said second bottoms stream is utilized as said high-boiling stream.

References Cited

UNITED STATES PATENTS

| | | | |
|---|---|---|---|
| 3,551,510 | 12/1970 | Pollitzer et al. | 260—672 T |
| 3,763,260 | 10/1973 | Pollitzer et al. | 260—672 T |
| 3,636,180 | 1/1972 | Broughton | 260—674 SA |
| 3,527,824 | 9/1970 | Pollitzer | 260—672 T |
| 3,562,345 | 2/1971 | Mitsche | 260—672 T |
| 3,629,350 | 12/1971 | Mocearov et al. | 260—672 T |
| 3,699,181 | 10/1972 | Kmecak et al. | 260—672 T |

CURTIS R. DAVIS, Primary Examiner

U.S. Cl. X.R.

260—674 SA